United States Patent
Reese et al.

(10) Patent No.: US 9,051,412 B2
(45) Date of Patent: Jun. 9, 2015

(54) BASE-CATALYZED, LONG CHAIN, ACTIVE POLYETHERS FROM SHORT CHAIN DMC-CATALYZED STARTERS

(71) Applicant: Bayer MaterialScience LLC, Pittsburgh, PA (US)

(72) Inventors: Jack R. Reese, Coraopolis, PA (US); Edward P. Browne, Cologne (DE); Steven J. Rodberg, Charleston, WV (US); Jose F. Pazos, Charleston, WV (US); Brian L. Neal, Pittsburgh, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 0 days.

(21) Appl. No.: 13/827,015

(22) Filed: Mar. 14, 2013

(65) Prior Publication Data
US 2014/0275312 A1    Sep. 18, 2014

(51) Int. Cl.
C07C 43/00    (2006.01)
C08G 18/48    (2006.01)
C08G 65/26    (2006.01)

(52) U.S. Cl.
CPC ........ C08G 18/4858 (2013.01); C08G 18/4833 (2013.01); C08G 18/485 (2013.01); C08G 18/4845 (2013.01); C08G 18/4816 (2013.01); C08G 65/2663 (2013.01); C08G 65/2609 (2013.01)

(58) Field of Classification Search
CPC .......... C08G 65/2663; C08G 65/2609; C08G 18/4833; C08G 18/485; C08G 18/4845; C08G 18/4816
USPC ................. 568/672, 613, 619, 620
See application file for complete search history.

(56) References Cited

U.S. PATENT DOCUMENTS

| | | |
|---|---|---|
| 3,427,256 A | 2/1969 | Milgrom |
| 3,427,334 A | 2/1969 | Belner |
| 3,427,335 A | 2/1969 | Herold |
| 3,829,505 A | 8/1974 | Herold |
| 4,355,188 A | 10/1982 | Herold et al. |
| 4,472,560 A | 9/1984 | Kuyper et al. |
| 4,477,589 A | 10/1984 | van der Hulst et al. |
| 5,158,922 A | 10/1992 | Hinney et al. |
| 5,470,813 A | 11/1995 | Le-Khac |
| 5,482,908 A | 1/1996 | Le-Khac |
| 5,545,601 A | 8/1996 | Le-Khac |
| 5,563,221 A | 10/1996 | Pazos |
| 6,008,263 A | 12/1999 | Thompson et al. |
| 6,066,683 A | 5/2000 | Beisner et al. |
| 6,689,710 B2 | 2/2004 | Grosch et al. |
| 6,764,978 B2 | 7/2004 | Grosch et al. |
| 7,919,575 B2 | 4/2011 | Browne |
| 2005/0096488 A1* | 5/2005 | Kaushiva .............. 568/679 |
| 2007/0203319 A1* | 8/2007 | Dexheimer et al. ......... 528/44 |
| 2010/0324340 A1 | 12/2010 | Pazos et al. |
| 2011/0230581 A1 | 9/2011 | Klescewski et al. |
| 2012/0022179 A1* | 1/2012 | Emge et al. .............. 521/174 |

* cited by examiner

Primary Examiner — Michael L Leonard
(74) Attorney, Agent, or Firm — N. Denise Brown

(57) ABSTRACT

The present invention provides long chain, active polyether polyols which are characterized by a functionality of 2 to 6 and an equivalent weight of 1000 to 2200 Da. These long chain polyethers comprise the alkoxylation product of (1) a starter composition having an equivalent weight of 350 Da or less, with (2) one or more alkylene oxides, in which up to 20% of ethylene oxide may be added as a cap, in the presence of (3) at least one basic catalyst. Suitable starter compositions (1) comprise the alkoxylation product of (a) a low molecular weight polyether having a functionality of 3 and an equivalent weight of less than 350 Da, (b) at least one low molecular weight starter compound comprising glycerin, and (c) propylene oxide or a mixture of propylene oxide and ethylene oxide, in the presence of (d) at least one double metal cyanide catalyst. A process for preparing these long chain polyether polyols is also disclosed.

12 Claims, No Drawings

BASE-CATALYZED, LONG CHAIN, ACTIVE POLYETHERS FROM SHORT CHAIN DMC-CATALYZED STARTERS

The present invention relates in general to polyols and, more specifically, to base-catalyzed, long chain, active polyether polyols made from short chain DMC-catalyzed polyol starters. A process for the preparation of these base-catalyzed, long chain, active polyether polyols is also disclosed.

Isocyanate reactive mixtures often contain polyols that are the polymerization products of alkylene oxides with polyhydric alcohols. In the preparation of such polyoxyalkylene polyols, starter compounds having active hydrogen atoms are oxyalkylated with alkylene oxides in the presence of a suitable catalyst. For many years, basic catalysts as well as double metal cyanide ("DMC") catalysts have been used in oxyalkylation reactions to prepare polyoxyalkylene polyols.

Base-catalyzed oxyalkylation involves oxyalkylating a low molecular weight starter compound, such as propylene glycol or glycerin, with an alkylene oxide, such as ethylene oxide or propylene oxide, in the presence of a basic catalyst, such as potassium hydroxide ("KOH") to form a polyoxyalkylene polyol. One potential method in base-catalyzed oxyalkylation to make polyoxyalkylene polyols that have equivalent weights greater than 500 Da, is to first produce an intermediate or KOH starter that has an equivalent weight less than 350 Da. This KOH starter is then used to make the high molecular weight product. The molecular weight of the KOH starter is defined to meet the minimum levels required for the reactor system used. The KOH required to make the final higher molecular weight product in such a process can be added at the start of the production of the KOH starter, after the KOH starter is made or added to the starter before the production of the final product. The production of the starter can be inefficient as the starter molecule (e.g. propylene glycol, glycerin, sorbitol) mixture with KOH can have high viscosity and the reaction with the alkylene oxide can be slow.

An efficient process by which low molecular weight polyethers are made may employ double metal cyanide (DMC) catalysts. Double metal cyanide complex catalysts are non-stoichiometric complexes of a low molecular weight organic complexing agent and optionally other complexing agents with a double metal cyanide salt, e.g. zinc hexacyanocobaltate. Suitable DMC catalysts are known to those skilled in the art. Exemplary DMC catalysts include those suitable for preparation of low unsaturation polyoxyalkylene polyether polyols, such as disclosed in U.S. Pat. Nos. 3,427,256; 3,427,334; 3,427,335; 3,829,505; 4,472,560; 4,477,589; and 5,158,922. Other DMC catalysts include those capable of preparing "ultra-low" unsaturation polyether polyols. Such catalysts are disclosed in U.S. Pat. Nos. 5,470,813 and 5,482,908, 5,545,601, 6,764,978 and 6,689,710.

U.S. Pat. No. 7,919,575 discloses a process for preparing lower molecular weight DMC-catalyzed polyols by adding excess acid to a starter feed stream than is possible using non-acidified continuous addition of starter (CAOS) feeds. The amount of excess acid must exceed that which is required for neutralization of the basicity of the starter. The addition of excess acid was also found to be beneficial to starters which do not contain basicity. This process comprises establishing oxyalkylation conditions in an oxyalkyation reactor in the presence of a DMC catalyst, continuously introducing into the reactor at least one alkylene oxide and a low molecular weight starter acidified with at least one of an inorganic protic mineral acid and an organic acid, wherein the acid is present in excess of 100 ppm, based on the weight of the low molecular weight starter. This process may be continuous or semi-batch.

U.S. Published Patent Application 20100324340 describes a process for preparing short chain polyether polyols from ultra-low water-content starkers via DMC catalysis. More specifically, this process comprises establishing oxyalkylation conditions in an oxyakylation reactor in the presence of a DMC catalyst, continuously introducing into the reactor at least one alkylene oxide, and at least one acidified, ultra-low water content starter, and recovering an oxyalkylated low molecular weight polyether polyol product. The acidified, ultra-low water content starter contains greater than about 100 ppm acid, and less than or equal to about 500 ppm of water, based on the weight of the starter. Short chain polyethers having hydroxyl numbers of from greater than 250 up to about 500 can be prepared from this process.

Although foams have been prepared from DMC catalyzed polyols, the presence of high molecular weight tail (HWMT) in these polyols have presented several challenges in this area. Long chain active polyethers have been found to be very sensitive to high molecular weight polypropylene oxide ("PPO"). Small amounts of PPO in propylene oxide ("PO") may cause the polyethers to not perform as expected in foam. DMC catalyst technology is known to produce high molecular weight tail that also may cause problems in foam.

U.S. Pat. Nos. 6,066,683 and 6,008,263 describe DMC catalyzed polyoxyalkylene polyols and molded and slab polyurethane foams prepared from these DMC catalyzed polyoxyalkylene polyols. These DMC catalyzed polyoxyalkylene polyols exhibit behavior and processing latitude similar to that of base-catalyzed analogs. During oxypropylation, small but effective amounts of ethylene oxide or alkylene oxide are copolymerized during the most substantial part of oxypropylation, which results in a random copolymer polyol, more specifically, a random polyoxypropylene/polyoxyethylene copolymer polyol. These DMC catalyzed polyols of U.S. Pat. No. 6,066,683 are characterized as spread EO polyoxypropylene polyols having a nominal functionality of 2 or more, a random oxyethylene content of about 1.5 wt. % to less than 10 wt. %, in which no more than 5 wt. % of the total DMC catalyzed oxyalkylation period used to prepare the spread EO polyoxypropylene polyol is conducted in the absence of ethylene oxide. In preparing the polyols of U.S. Pat. No. 6,008,263 by conventional batch and CAOS polyoxyalkylation processes, it is preferred that the amount of ethylene oxide in the external block not be disproportionately larger than the amount of ethylene oxide contained in the internal block. The CAOS process as described in this reference results in bicompositional polyethers. Both multiblock and bicompositional polyols are disclosed as being suitable for preparing molded and slab polyurethane foams.

A need exists in the art for processes for producing long chain, active polyether polyols from low molecular weight starters that are made using an efficient process. A need also exists for KOH polyether polyols prepared from a low molecular weight starter produced using an efficient process which will perform similarly to KOH catalyzed polyether polyols in critical flexible foam tests including, for example, high water, low density foams and/or high index foams.

In the present application, the inventors have surprisingly found that short chain polyethers made with DMC catalysts can be used as starters to produce long chain active polyethers with basic (e.g. KOH) catalysis. Some advantages of the present invention include lower cycle time for using short chain polyethers as starters, the ability to continuously make starter, the ability to continuously add a basic catalyst such as, for example, KOH, and the ability to continuously remove water via packed columns, membranes, sieves, etc. The present invention also improves the productivity of preparing long chain active polyethers from short chain polyethers.

SUMMARY OF THE INVENTION

The present invention relates to long chain polyether polyols which are characterized by a functionality of 2 to 6 and an equivalent weight of 1000 to 2200 Da. These polyether polyols comprise the alkoxylation product of:
(1) a starter composition having an equivalent weight of 350 Da or less, which comprises the alkoxylation product of
  (a) a low molecular weight polyether having a functionality of 3 and an equivalent weight of less than 350 Da,
  (b) at least one low molecular weight starter compound comprising glycerin, and
  (c) propylene oxide or a mixture of propylene oxide and ethylene oxide, with the weight ratio of propylene oxide to ethylene oxide ranging from 80:20 to 100:0,
  in the presence of
  (d) at least one double metal cyanide catalyst;
with
(2) one or more alkylene oxides, wherein up to 20% of ethylene oxide is added as a cap;
in the presence of
(3) at least one basic catalyst.

The present invention also relates to a process for preparing these long chain polyether polyols which are characterized by a functionality of 2 to 6 and an equivalent weight of 1000 to 2200 Da. This process comprises
(A) alkoxylating
(1) a starter composition having an equivalent weight of 350 Da or less, and which comprises the alkoxylation product of
  (a) a low molecular weight polyether having a functionality of 3 and an equivalent weight of less than 350 Da,
  (b) at least one low molecular weight starter compound comprising glycerin, and
  (c) propylene oxide or a mixture of propylene oxide and ethylene oxide, with the weight ratio of propylene oxide to ethylene oxide ranging from 80:20 to 100:0,
  in the presence of
  (d) at least one double metal cyanide catalyst;
with
(2) one or more alkylene oxides, wherein up to 20% of ethylene oxide is added as a cap;
in the presence of
(3) at least one basic catalyst.

Another aspect of the present invention relates to a process for the production of polyurethane foams, preferably a flexible polyurethane foam, which comprises (1) reacting at least one polyisocyanate component with at least one isocyanate-reactive component in the presence of at least one blowing agent and at least one catalyst, the improvement wherein said isocyanate-reactive component comprises the long chain polyether polyol described herein.

Polyurethane foams, preferably flexible foams, which comprise the above described long chain polyether polyols are another aspect of the present invention. These polyurethane foams comprise the reaction product of at least one polyisocyanate component with at least one isocyanate-reactive component that comprises the long chain polyether polyols, in the presence of at least one blowing agent and at least one catalyst.

DETAILED DESCRIPTION OF THE INVENTION

The present invention will now be described for purposes of illustration and not limitation. Except in the operating examples, or where otherwise indicated, all numbers expressing quantities, percentages, hydroxyl numbers, functionalities and so forth in the specification are to be understood as being modified in all instances by the term "about." In accordance with the present invention, any combination of upper and lower limits of various ranges disclosed herein can be used unless otherwise stated. Equivalent weights and molecular weights given herein in Daltons (Da) are number average equivalent weights and number average molecular weights respectively, unless indicated otherwise.

The long chain polyether polyols of the present invention are characterized by a functionality of 2 to 6 and an equivalent weight of 1000 to 2000 Da. Preferably, these polyether polyols are characterized by a functionality of 2 to 4 and an equivalent weight of 1500 to 2000 Da.

These long chain polyether polyols comprise the alkoxylation product of (1) a starter composition having an equivalent weight of 350 Da or less, preferably 150 to 280 Da, with (2) one or more alkylene oxides, wherein up to 20% of ethylene oxide is added as a cap; in the presence of (3) at least one basic catalyst.

Suitable starter compositions to be used as component (1) in the long chain polyether polyols have an equivalent weight of 350 Da or less, preferably 150 to 280 Da. These starter compositions comprise the alkoxylation product of (a) a low molecular weight polyether polyol having a functionality of 3 and an equivalent weight of less than 350 Da, preferably 150 to 280 Da; (b) at least one low molecular weight starter compound comprising glycerin, and (c) propylene oxide or a mixture of propylene oxide and ethylene oxide, with the weight ratio of propylene oxide to ethylene oxide ranging from 80:20 to 100:0.

Suitable low molecular weight polyether polyols to be used as component (a) of the starter compositions (1) have a functionality of 3 and an equivalent weight of less than 350 Da. Preferably, these low molecular weight polyether polyols have an equivalent weight of from 150 to 280 Da. In a particularly preferred embodiment, the low molecular weight polyether polyol comprises (i) an all propylene oxide, glycerin based polyether polyol having an equivalent weight of about 230 to about 235 or (ii) an all propylene oxide, glycerin based polyether polyol having an equivalent weight of about 330 to about 335.

The starter compositions (a) additionally require (2) a low molecular weight starter compound comprising glycerin. In addition, to glycerin, the low molecular weight starter compound may comprise ethylene glycol, propylene glycol, diethylene glycol, dipropylene glycol, tripropylene glycol, trimethylolpropane, 1,3-butanediol, 1,4-butanediol, pentaerythritol, sorbitol, sucrose, ethylenediamine, toluene diamine, etc. Mixtures of these low molecular weight starter compounds are also suitable. In a preferred embodiment, the low molecular weight starter compound comprises glycerin in the absence of other low molecular weight starter compounds.

In accordance with the present invention, component (a) the low molecular weight polyether polyols and component (b) the low molecular weight starter compounds are mutually exclusive.

Component (c) of the starter composition (1) comprises propylene oxide or a mixture of propylene oxide and ethylene oxide, with the weight ratio of propylene oxide to ethylene oxide ranging from 80:20 to 100:0, and preferably from 90:10 to 100:0.

Component (d) of the starter composition (1) is a double metal cyanide catalyst. Suitable double metal cyanide (DMC) catalysts to be used in the process of the present invention include, for example, any known DMC catalyst. These include both the crystalline and the substantially non-crystalline (i.e. substantially amorphous) DMC catalysts. Crystalline DMC catalysts are known and described in, for example, U.S. Pat. Nos. 5,158,922, 4,477,589, 3,427,334, 3,941,849 and 5,470,813, the disclosures of which are hereby incorporated by reference. Double metal cyanide (DMC) catalysts which exhibit a substantially non-crystalline character (i.e. are substantially amorphous) are known and described in, for example, U.S. Pat. Nos. 5,482,908 and 5,783,513, the disclosures of which are hereby incorporated by reference.

The catalysts disclosed in U.S. Pat. Nos. 5,482,908 and 5,783,513 differ from other DMC catalysts because these catalysts exhibit a substantially non-crystalline morphology. In addition, these catalysts are based on a combination of ligands, such as t-butyl alcohol and a polydentate ligand (polypropylene oxide polyol). Zinc hexacyanocobaltates are preferred DMC catalysts. Preferred DMC catalysts are the substantially amorphous catalysts.

The DMC catalyst concentration in the inventive process is chosen to ensure a good control of the polyoxyalkylation reaction under the given reaction conditions. The catalyst concentration is preferably in the range from 15 ppm to 200 ppm, more preferably in the range from 20 ppm to 150 ppm, most preferably in the range from 30 to 120 ppm, based on the weight of the polyether polyol produced. The crystalline and the substantially non-crystalline DMC catalysts may be present in an amount ranging between any combination of these values, inclusive of the recited values.

In accordance with the present invention, component (1) the starter composition having an equivalent weight of 350 Da or less is prepared by alkoxylating (a) the low molecular weight polyether, (b) a low molecular weight starter compound comprising glycerin, and (c) propylene oxide or a mixture of propylene oxide and ethylene oxide in a weight ratio of 80:20 to 100:0, in the present of (d) at least one double metal cyanide catalyst, at a temperature of 100° C. to 160° C. Typical conditions for preparing these starter compositions using DMC catalysis can be found in, for example, U.S. Pat. No. 7,919,575 and U.S. Published Patent Application 20100324340, the disclosures of which are herein incorporated by reference.

Suitable alkylene oxides useful as component (2) herein include, but are not limited to, ethylene oxide, propylene oxide, oxetane, 1,2- and 2,3-butylene oxide, isobutylene oxide, epichlorohydrin, cyclohexene oxide, styrene oxide, and the higher alkylene oxides such as the $C_5$-$C_{30}$ α-alkylene oxides. Propylene oxide alone or mixtures of propylene oxide with ethylene oxide or another alkylene oxide are preferred. Other polymerizable monomers may be used as well, e.g., anhydrides and other monomers as disclosed in U.S. Pat. Nos. 3,404,109, 3,538,043 and 5,145,883, the disclosures of which are herein incorporated by reference.

In accordance with the present invention, up to 20% of ethylene oxide is added as a cap. Preferably from 15 to 20% of ethylene oxide is added as a cap. The weight basis for the ethylene oxide cap is based on the total weight of the final product.

Suitable basic catalysts to be used as component (3) of the invention include, for example, potassium hydroxide, sodium hydroxide and cesium hydroxide. Potassium hydroxide is preferred. In accordance with the present invention, from 0.2 to 0.5% by weight, preferably from 0.3 to 0.4% by weight, based on the weight of the final product, of basic catalyst is present.

The process of preparing these long chain polyether polyols comprises (A) alkoxylating (1) the starter compositions having an equivalent weight of 350 Da or less as described above, with (2) one or more alkylene oxides, wherein up to 20% of ethylene oxide is added as a cap, in the presence of (3) at least one basic catalyst. This process conditions required to make the long chain polyethers are known to those skilled in the art. The low molecular weight starter is charged to the reactor, KOH or another basic catalyst is added, and the starter+KOH is heated to the reaction temperature (between about 105° C. and about 130° C.) and stripped with vacuum and nitrogen to remove water. The nitrogen is stopped after the water is removed and PO or mixture of PO and EO is added to the reactor. The PO or mixture of PO and EO is fed over 2 to 10 hours depending on the configuration and heat removal capabilities of the reactor. After the total amount of PO or mixture of PO and EO is fed, the reactor contents are allowed to react further until the pressure in the reactor is level indicating no further change in the amount of oxide present. The reactor is then inerted with nitrogen and the EO cap is started. The EO cap is completed in the same temperature range as the PO feed portion. After the total amount of EO is fed, the reactor contents are allowed to react further until the pressure in the reactor is level. The final polyether containing KOH or basic catalyst must then be refined to remove the KOH or basic catalyst by techniques know to those skilled in the art. These include but are not limited to acid neutralization followed by filtration, treatment with solid adsorbents, treatment with solid inorganic compounds and treatment of ion exchanges resins.

The long chain polyether polyols made by the inventive processes are particularly suitable for the manufacture of polyurethane foams, specifically flexible polyurethane foams, by reaction of the long chain polyether polyol with a polyisocyanate, in the presence of one or more catalysts, one or more blowing agents, and one or more surfactants. It is also possible that other additives such as, for example, fillers, pigments flame retardants and other additives may be present. These polyurethane foams may be used in automotive seating, high resilience slab applications, etc.

Suitable polyisocyanates are known to those skilled in the art and include unmodified isocyanates, modified polyisocyanates, and isocyanate prepolymers. Such organic polyisocyanates include aliphatic, cycloaliphatic, araliphatic, aromatic, and heterocyclic polyisocyanates of the type described, for example, by W. Siefken in Justus Liebigs Annalen der Chemie, 562, pages 75 to 136. Examples of such isocyanates include those represented by the formula,

in which n is a number from 2-5, preferably 2-3, and Q is an aliphatic hydrocarbon group containing 2-18, preferably 6-10, carbon atoms; a cycloaliphatic hydrocarbon group containing 4-15, preferably 5-10, carbon atoms; an araliphatic hydrocarbon group containing 8-15, preferably 8-13, carbon atoms; or an aromatic hydrocarbon group containing 6-15, preferably 6-13, carbon atoms.

Examples of suitable isocyanates include ethylene diisocyanate; 1,4-tetramethylene diisocyanate; 1,6-hexamethylene diisocyanate; 1,12-dodecane diisocyanate; cyclobutane- 1,3-diisocyanate; cyclohexane-1,3- and -1,4-diisocyanate, and mixtures of these isomers; 1-isocyanato-3,3,5-trimethyl-5-isocyanatomethylcyclohexane (isophorone diisocyanate; e.g. German Auslegeschrift 1,202,785 and U.S. Pat. No. 3,401,190); 2,4- and 2,6-hexahydrotoluene diisocyanate and mixtures of these isomers; dicyclohexylmethane-4,4'-diisocyanate (hydrogenated MDI, or HMDI); 1,3- and 1,4-phenylene diisocyanate; 2,4- and 2,6-toluene diisocyanate and mixtures of these isomers (TDI); diphenylmethane-2,4'- and/or -4,4'-diisocyanate (MDI); naphthylene-1,5-diisocyanate; triphenylmethane-4,4',4"-triisocyanate; polyphenyl-polymethylene-polyisocyanates of the type which may be obtained by condensing aniline with formaldehyde, followed by phosgenation (crude MDI), which are described, for example, in GB 878,430 and GB 848,671; norbornane diisocyanates, such as described in U.S. Pat. No. 3,492,330; m- and p-isocyanatophenyl sulfonylisocyanates of the type described in U.S. Pat. No. 3,454,606; perchlorinated aryl polyisocyanates of the type described, for example, in U.S. Pat. No. 3,227,138; modified polyisocyanates containing carbodiimide groups of the type described in U.S. Pat. No. 3,152,162; modified polyisocyanates containing urethane groups of the type described, for example, in U.S. Pat. Nos. 3,394,164 and 3,644,457; modified polyisocyanates containing allophanate groups of the type described, for example, in GB 994,890, BE 761,616, and NL 7,102,524; modified polyisocyanates containing isocyanurate groups of the type described, for example, in U.S. Pat. No. 3,002,973, German Patentschriften 1,022,789, 1,222,067 and 1,027,394, and German Offenlegungsschriften 1,919,034 and 2,004,048; modified polyisocyanates containing urea groups of the type described in German Patentschrift 1,230,778; polyisocyanates containing biuret groups of the type described, for example, in German Patentschrift 1,101,394, U.S. Pat. Nos. 3,124,605 and 3,201,372, and in GB 889,050; polyisocyanates obtained by telomerization reactions of the type described, for example, in U.S. Pat. No. 3,654,106; polyisocyanates containing ester groups of the type described, for example, in GB 965,474 and GB 1,072,956, in U.S. Pat. No. 3,567,763, and in German Patentschrift 1,231,688; reaction products of the above-mentioned isocyanates with acetals as described in German Patentschrift 1,072,385; and polyisocyanates containing polymeric fatty acid groups of the type described in U.S. Pat. No. 3,455,883. It is also possible to use the isocyanate-containing distillation residues accumulating in the production of isocyanates on a commercial scale, optionally in solution in one or more of the polyisocyanates mentioned above. Those skilled in the art will recognize that it is also possible to use mixtures of the polyisocyanates described above.

In general, it is preferred to use readily available polyisocyanates, such as 2,4- and 2,6-toluene diisocyanates and mixtures of these isomers (TDI); polyphenyl-polymethylene-polyisocyanates of the type obtained by condensing aniline with formaldehyde, followed by phosgenation (crude MDI); and polyisocyanates containing carbodiimide groups, urethane groups, allophanate groups, isocyanurate groups, urea groups, or biuret groups (modified polyisocyanates). Toluene diisocyanate is a preferred isocyanate. In particular, a mixture of 80% of the 2,4-isomer of toluene diisocyanate and 20% of the 2,6-isomer of toluene diisocyanate is most preferred.

Isocyanate-terminated prepolymers may also be employed in the preparation of the foams of the present invention. Prepolymers may be prepared by reacting an excess of organic polyisocyanate or mixtures thereof with a minor amount of an active hydrogen-containing compound as determined by the well-known Zerewitinoff test, as described by Kohler in *Journal of the American Chemical Society*, 49, 3181 (1927). These compounds and their methods of preparation are well known to those skilled in the art. The use of any one specific active hydrogen compound is not critical; any such compound can be employed in the practice of the present invention.

Suitable isocyanate-reactive components for polyurethane foams and the process of preparing polyurethane foams comprise the long chain polyether polyols described herein. These may be the sole isocyanate-reactive component, or these may be used in combination with other known polyether polyols, polyester polyols, polycarbonate polyols, polymer polyols, etc. as well as crosslinking agents and chain extenders. It is well known in the art that the addition of isocyanate-reactive cross-linkers and/or chain extenders can be added to polyurethane formulations to improve processing or to affect the physical properties of the resultant foams. Such modifiers typically are glycols or glycol amines, and, in general, will have a molecular weight of less than 350 and a having functionality between 2 and 8.

Suitable blowing agents to be used in polyurethane foams and a process of making these foams in accordance with the present invention include, but are not limited to, compounds such as, for example, water, carbon dioxide, fluorocarbons, chlorofluorocarbons, hydrochlorofluorocarbons, perfluorocarbons, and low boiling hydrocarbons. Some examples of suitable hydrochlorofluoro-carbons include compounds such as 1,1-dichloro-1-fluoroethane (HCFC-141b), 1-chloro-1,1-difluoroethane (HCFC-142b), and chlorodifluoro-methane (HCFC-22); of suitable hydrofluorocarbons include compounds such as 1,1,1,3,3-pentafluoropropane (HFC-245fa), 1,1,1,2-tetrafluoro-ethane (HFC-134a), 1,1,1,3,3,3-hexafluoropropane (HFC-236fa), 1,1,2,3,3,3-hexafluoropropane (HFC-236ea), and 1,1,1,4,4,4-hexafluorobutane (HFC-356mffm); of suitable perfluorinated hydrocarbons include compounds such as perfluoropentane or perfluorohexane; and of suitable hydrocarbons include compounds such as various isomers of butane, pentane, cyclopentane, hexane, or mixtures of thereof. Water and carbon dioxide are more preferred blowing agents, with water being most preferred.

In accordance with the present invention, the quantity of blowing agent used is typically that which will produce foams having a density as described herein. As one of ordinary skill in the art would know and understand, it is necessary to use a larger quantity of blowing agent to form a lower density foam while a higher density foam requires a smaller quantity of blowing agent. The quantity of blowing used should typically produce foams which have a density of about 0.5 pcf or more, preferably about 1.0 pcf or more, more preferably about 1.2 or more, and most preferably about 1.5 pcf or more. The quantity of blowing agent used should also typically produce foams which have a density of less than or equal to 20 pcf, preferably less than or equal to 10 pcf, and more preferably less or equal to 8 pcf and most preferably less or equal to 5 pcf. The quantity of blowing agent used in the present invention should produce a foam having a density ranging between any combination of these upper and lower values, inclusive, e.g. from at least about 0.5 to about 20 pcf, preferably from about 1.0 to about 10 pcf, more preferably from about 1.2 to about 8 pcf, and most preferably from about 1.5 to about 5 pcf.

Suitable surfactants to be used in the polyurethane foams in accordance with the present invention include, for example, any of the known surfactants which are suitable for production of polyurethane foams. These include, for example, but are not limited to silicone-type surfactants, fluorine-type surfactants, organic surfactants, etc. Organo-silicone copolymer surfactants are widely used in the production of polyurethane foams with polysiloxane-polyoxyalkylene copolymers representing a preferred class. Some examples of suitable surfactants include those compounds commercially available from Degussa-Goldschmidt, General Electric, Air Products, etc. such as those sold as NIAX Silicones L-620, L-5614, L-627, L-6164, L-3858, L-629, L-635, U-2000, etc., and TEGOSTAB Silicones B-8002, B-2370, B-8229, B-8715F, B-8715LF, B-8719LF, etc., and DABCO DC5043, DC5160, DC5169, DC5164, etc.

In accordance with the invention, one or more catalysts are also used. Any suitable urethane catalyst may be used, including the known tertiary amine compounds and organometallic compounds. Examples of suitable tertiary amine catalysts include triethylenediamine, N-methyl-morpholine, pentamethyl diethylenetriamine, dimethylcyclohexylamine, tetramethylethylenediamine, 1-methyl-4-dimethylaminoethyl-piperazine, 3-methoxy-N-dimethyl-propylamine, bis[2-dimethylaminoethyl]ether, diazabicyclooctane, N-ethylmorpholine, diethylethanolamine, N-cocomorpholine, N,N-dimethyl-N',N'-dimethylisopropyl-propylene diamine, N,N-diethyl-3-diethyl aminopropylamine and dimethyl-benzyl amine. Examples of suitable organometallic catalysts include organomercury, organolead, organoferric and organotin catalysts, with organotin catalysts being preferred. Suitable organotin catalysts include preferably, tin(II) salts of carboxylic acids, such as tin(II) acetate, tin(II) octoate, tin(II) ethylhexoate, and tin(II) laurate, as well as tin(IV) compounds, such as dibutyltin dilaurate, dibutyltin dichloride, dibutyltin diacetate, dibutyltin maleate, and dioctyltin diacetate. Suitable bismuth compounds include bismuth neodecanoate, bismuth versalate, and various bismuth carboxylates known in the art. Metal salts such as stannous chloride can also function as catalysts for the urethane reaction. Such catalysts are typically used in an amount, which measurably increases the rate of reaction of the polyisocyanate. Typical amounts are about 0.01 to about 4.0 pbw, and preferably about 0.03 to about 2.0 pbw of catalyst (i.e. the total of all catalysts) per 100 parts by weight of (B) the isocyanate-reactive component.

Other suitable additives which may optionally be included in the polyurethane forming formulations of the present invention include, for example, foam stabilizers, cell regulators, reaction inhibitors, flame retardants, plasticizers, antioxidants, dyes, pigments, liquid and solid fillers, etc. This list is not, however, intended to be limiting. Such additives can also be included in the foams in conventional amounts. Further examples of suitable additives, which may optionally be included in the polyurethane foams of the present invention can be found in *Kunststoff-Handbuch*, volume VII, edited by Vieweg & Hochtlen, Carl Hanser Verlag, Munich 1993, 3rd Ed., pp. 104 to 127, for example. The relevant details concerning the use and mode of action of these additives are set forth therein.

The flexible foams of the present invention are prepared by mixing together one or more isocyanates with the isocyanate reactive component, one or more blowing agents, one or more catalysts, one or more surfactants, and optionally various other additives known to those in the art. After mixing, the foaming mixture may be deposited into an open container or continuously onto a moving conveyor and be allowed to rise freely (free-rise process). The open container or conveyor may be enclosed in a chamber to provide for foam rise under vacuum or with increased pressure (Variable Pressure Foaming Process). The foaming mixture may also be deposited into a mold that is then closed thus forcing the foam to take on the shape of the mold (molded process).

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

Preparation of Glycerin Starters

GS1: A 700 MW (238 OH#) all-PO, glycerin based polyether was charged to reactor (2300 g) along with a double metal cyanide catalyst prepared according to the procedure in U.S. Pat. No. 5,482,908 (2.76 g). This mixture was heated to 130° C. with nitrogen stripping of the 700 MW polyether-catalyst blend. Propylene oxide (115 g) was charged to activate the catalyst. After activation, the reactor temperature was maintained at 130° C. and introduction of propylene oxide (ramp to 45 g/min) was begun. After 4.5% of the total PO feed was completed, glycerin (14 g/min) was introduced into the reactor. After 86% of the alkoxylation was completed, the glycerin feed ended (3225 g glycerin). The propylene oxide continued feeding until reaching the target weight (12860 g for PO). The oxide was allowed to cookout at reaction temperature for 30 minutes. The final polyether product was stripped with nitrogen and vacuum before being discharged from the reactor. The final product was inhibited with BHT (butylhydroxytoluene) or equivalent. The final product had a hydroxyl number of 348 and a viscosity of 351 cst.

GS2: A 700 MW (238 OH#) all-PO, glycerin based polyether was charged to reactor (2300 g) along with a double metal cyanide catalyst prepared according to the procedure in U.S. Pat. No. 5,482,908 (2.76 g). This mixture was heated to 130° C. with nitrogen stripping of the 700 MW polyether-catalyst blend. Propylene oxide (115 g) was charged to activate the catalyst. After activation, the reactor temperature was maintained at 130° C. and introduction of propylene oxide (ramp to 45 g/min) was begun. After 4.5% of the total PO feed was completed, glycerin (14 g/min) was introduced into the reactor. After 86% of the alkoxylation was completed, the glycerin feed ended (3225 g glycerin). The propylene oxide continued feeding until reaching the target weight (12860 g for PO). The oxide was allowed to cookout at reaction temperature for 30 minutes. The final

EXAMPLES

Preparation of Glycerin Starters

GS1: A 700 MW (238 OH#) all-PO, glycerin based polyether was charged to reactor (2300 g) along with a double metal cyanide catalyst prepared according to the procedure in U.S. Pat. No. 5,482,908 (2.76 g). This mixture was heated to 130° C. with nitrogen stripping of the 700 MW polyether-catalyst blend. Propylene oxide (115 g) was charged to activate the catalyst. After activation, the reactor temperature was maintained at 130° C. and introduction of propylene oxide (ramp to 45 g/min) was begun. After 4.5% of the total PO feed was completed, glycerin (14 g/min) was introduced into the reactor. After 86% of the alkoxylation was completed, the glycerin feed ended (3225 g glycerin). The propylene oxide continued feeding until reaching the target weight (12860 g for PO). The oxide was allowed to cookout at reaction temperature for 30 minutes. The final polyether product was stripped with nitrogen and vacuum before being discharged from the reactor. The final product was inhibited with BHT (butylhydroxytoluene) or equivalent. The final product had a hydroxyl number of 348 and a viscosity of 351 cst.

GS2: A 700 MW (238 OH#) all-PO, glycerin based polyether was charged to reactor (2300 g) along with a double metal cyanide catalyst prepared according to the procedure in U.S. Pat. No. 5,482,908 (2.76 g). This mixture was heated to 130° C. with nitrogen stripping of the 700 MW polyether-catalyst blend. Propylene oxide (115 g) was charged to activate the catalyst. After activation, the reactor temperature was maintained at 130° C. and introduction of propylene oxide (ramp to 45 g/min) was begun. After 4.5% of the total PO feed was completed, glycerin (14 g/min) was introduced into the reactor. After 86% of the alkoxylation was completed, the glycerin feed ended (3225 g glycerin). The propylene oxide continued feeding until reaching the target weight (12860 g for PO). The oxide was allowed to cookout at reaction temperature for 30 minutes. The final polyether product was stripped with nitrogen and vacuum before being discharged from the reactor. The final product was inhibited with BHT or equivalent. The final product had a hydroxyl number of 346 and a viscosity of 344 cst.

GS3: A 700 MW (238 OH#) all-PO, glycerin based polyether was charged to reactor (2500 g) along with a double metal cyanide catalyst prepared according to the procedure in U.S. Pat. No. 5,482,908 (1.2 g). This mixture was heated to 130° C. with nitrogen stripping of the 700 MW polyether-catalyst blend. Propylene oxide (125 g) was charged to activate the catalyst. After activation, the reactor temperature was maintained at 130° C. and introduction of propylene oxide (ramp to 89 g/min) was begun. After 1.6% of the total PO had been fed, propylene glycol (2.1 g/min) was started, and after 4.1% of the total PO was completed, glycerin (15.2 g/min) was introduced into the reactor. After 47% of the alkoxylation was completed, the propylene glycol feed ended (154 g) and after 87% of the alkoxylation, the glycerin feed ended (2155 g glycerin). The propylene oxide continued feeding until reaching the target weight (15191 g for PO). The oxide was allowed to cookout at reaction temperature for 30 minutes. The final polyether product was stripped with nitrogen and vacuum before being discharged from the reactor. The final product was inhibited with BHT or equivalent. The final product had a hydroxyl number of 238 and a viscosity of 260 cst.

GS4: A 700 MW (238 OH#) all-PO, glycerin based polyether was charged to reactor (2500 g) along with a double metal cyanide catalyst prepared according to the procedure in U.S. Pat. No. 5,482,908 (1.2 g). This mixture was heated to 130° C. with nitrogen stripping of the 700 MW polyether-catalyst blend. Propylene oxide (200 g) was charged to activate the catalyst. After activation, the reactor temperature was maintained at 130° C. and introduction of propylene oxide (ramp to 87.6 g/min) was begun. After 4.1% of the total PO feed was completed, glycerin (16.9 g/min) was introduced into the reactor. After 87% of the alkoxylation was completed, the glycerin feed ended (2410 g glycerin). The propylene oxide continued feeding until reaching the target weight (15090 g for PO). The oxide was allowed to cookout at reaction temperature for 30 minutes. The final polyether product was stripped with nitrogen and vacuum before being discharged from the reactor. The final product was inhibited with BHT or equivalent. The final product had a hydroxyl number of 245 and a viscosity of 279 cst.

GS5: A 1000 MW (168 OH#) all-PO, glycerin based polyether was charged to reactor (2500 g) along with a double metal cyanide catalyst prepared according to the procedure in U.S. Pat. No. 5,482,908 (1.2 g). This mixture was heated to 130° C. with nitrogen stripping of the 1000 MW polyether-catalyst blend. Propylene oxide (200 g) was charged to activate the catalyst. After activation, the reactor temperature was maintained at 130° C. and introduction of propylene oxide (ramp to 92.3 g/min) was begun. After 3.9% of the total PO feed was completed, glycerin (11.2 g/min) was introduced into the reactor. After 87% of the alkoxylation was completed, the glycerin feed ended (1609 g glycerin). The propylene oxide continued feeding until reaching the target weight (15691 g for PO). The oxide was allowed to cookout at reaction temperature for 30 minutes. The final polyether product was stripped with nitrogen and vacuum before being discharged from the reactor. The final product was inhibited with BHT or equivalent. The final product had a hydroxyl number of 169 and a viscosity of 281 cst.

GS6: A 700 MW all-PO, glycerin based polyether was prepared using a continuous polyether process (U.S. Pat. No. 5,689,013) in the following manner: A 700 MW (238 OH#) all-PO, glycerin based polyether that contains 30 ppm of DMC catalyst was charged to a 1 gallon stainless steel reactor equipped with a mechanical agitator and slowly heated. During the heat-up continuous vacuum was pulled on the headspace and nitrogen was introduced to the liquid phase via a dip tube. Once the reactor temperature reached 130° C., the vacuum and nitrogen continued for an additional ten minutes, the nitrogen was then stopped and the reactor was blocked in at a pressure of 1.5 psia. An initial charge of PO was charged to the reactor over several minutes. After 10 minutes the pressure in the reactor decreased indicating that the DMC catalyst was active. The PO was restarted and set at a rate of 20.6 g/min (equivalent to a 2.5 hour residence time). After establishing the oxide feed, a feed containing glycerin (93 wt %) and propylene glycol (7 wt %) with 454 ppm of DMC catalyst and 75 ppm of phosphoric acid was started at a rate of 3.1 g/min. The DMC catalyst was added to the glycerin/PG as a dry powder and remained dispersed in the glycerin/PG by constant agitation of the glycerin/PG/DMC catalyst feed vessel. The glycerin/PG/catalyst feed line can also have constant recirculation between the reactor feed point and the glycerin/PG/catalyst feed vessel to eliminate settling of the catalyst in the feed line. The DMC concentration in the glycerin/PG is sufficient to provide 60 ppm in the final product. When the pressure in the reactor reached 47 psia, a valve at the top of the reactor was opened to a back pressure regulator and the contents of the liquid full reactor were allowed to flow out of the reactor. The polyether passed through a steam heated section of pipe before being collected in a heated and stirred jacketed vessel. After approximately 8 hours of line-out, collection of the final product was started. The reaction continued for 20 hours at which point the reaction was stopped. A sample of the inhibited, collected product had a hydroxyl number of 218 mg KOH/g and a viscosity of 261 cst.

GS7: A 700 MW (238 OH#), glycerin based polyether made with a double metal cyanide catalyst prepared according to the procedure in U.S. Pat. No. 5,482,908 and containing 3.8% EO (95/5 PO/EO feed ratio from a 700 MW all-PO starter and an 8 build ratio) was charged to reactor (2500 g) along with a double metal cyanide catalyst prepared according to the procedure in U.S. Pat. No. 5,482,908 (1.2 g). This mixture was heated to 130° C. with nitrogen stripping of the 700 MW polyether-catalyst blend. Propylene oxide (119 g) and ethylene oxide (6 g) were charged to activate the catalyst. After activation, the reactor temperature was maintained at 130° C. and introduction of propylene oxide (ramp to 62.4 g/min) and ethylene oxide (ramp to 3.3 g/min) was begun. The oxide feed ratio of 95% PO and 5% EO was maintained for the entire feed. After 4.2% of the total oxide feed was completed, glycerin (11.3 g/min) was introduced into the reactor. After 87% of the alkoxylation was completed, the glycerin feed ended (2279 g glycerin). The propylene oxide and ethylene oxide continued feeding until reaching their target weights (14460 g for PO and 761 g for EO). The oxide was allowed to cookout at reaction temperature for 30 minutes. The final polyether product was stripped with nitrogen and vacuum before being discharged from the reactor. The final product was inhibited with BHT or equivalent. The final product had a hydroxyl number of 236 and a viscosity of 267 cst.

GS8: A 700 MW (238 OH#), glycerin based polyether made with a double metal cyanide catalyst prepared according to the procedure in U.S. Pat. No. 5,482,908 and containing 7.6% EO (90/10 PO/EO feed ratio from a 700 MW all-PO starter and an 8 build ratio) was charged to reactor (2500 g) along with a double metal cyanide catalyst prepared according to the procedure in U.S. Pat. No. 5,482,908 (1.2 g). This mixture was heated to 130° C. with nitrogen stripping of the 700 MW polyether-catalyst blend. Propylene oxide (180 g) and ethylene oxide (20 g) were charged to activate the catalyst. After activation, the reactor temperature was maintained at 130° C. and introduction of propylene oxide (ramp to 58.8 g/min) and ethylene oxide (ramp to 6.5 g/min) was begun. The oxide feed ratio of 90% PO and 10% EO was maintained for the entire feed. After 42% of the total oxide feed was completed, glycerin (11.8 g/min) was introduced into the reactor. After 87% of the alkoxylation was completed, the glycerin feed ended (2279 g glycerin). The propylene oxide and ethylene oxide continued feeding until reaching their target weights (13699 g for PO and 1522 g for EO). The oxide was allowed to cookout at reaction temperature for 30 minutes. The final polyether product was stripped with nitrogen and vacuum before being discharged from the reactor. The final product was inhibited with BHT or equivalent. The final product had a hydroxyl number of 239 and a viscosity of 258 cst.

GS9: A 700 MW (238 OH#) all-PO, glycerin based polyether was charged to reactor (2500 g) along with a double metal cyanide catalyst prepared according to the procedure in U.S. Pat. No. 5,482,908 (1.2 g). This mixture was heated to 130° C. with nitrogen stripping of the 700 MW polyether-catalyst blend. Propylene oxide (180 g) and ethylene oxide (20 g) were charged to activate the catalyst. After activation, the reactor temperature was maintained at 130° C. and introduction of propylene oxide (ramp to 59 g/min) and ethylene oxide (ramp to 6.5 g/min) was begun. The oxide feed ratio of 90% PO and 10% EO was maintained for the entire feed. After 4.2% of the total oxide feed was completed, glycerin (10.6 g/min) was introduced into the reactor. After 87% of the alkoxylation was completed, the glycerin feed ended (2279 g glycerin). The propylene oxide and ethylene oxide continued feeding until reaching their target weights (13699 g for PO and 1522 g for EO). The oxide was allowed to cookout at reaction temperature for 30 minutes. The final polyether product was stripped with nitrogen and vacuum before being discharged from the reactor. The final product was inhibited with BHT or equivalent. The final product had a hydroxyl number of 240 and a viscosity of 258 cst.

GS10: A 700 MW EO-containing, glycerin based polyether was prepared using a continuous polyether process (U.S. Pat. No. 5,689,013) in the following manner: A 700 MW (238 OH#) all-PO, glycerin based polyether that contains 30 ppm of DMC catalyst was charged to a 1 gallon stainless steel reactor equipped with a mechanical agitator and slowly heated. During the heat-up continuous vacuum was pulled on the headspace and nitrogen was introduced to the liquid phase via a dip tube. Once the reactor temperature reached 130° C., the vacuum and nitrogen continued for an additional ten minutes, the nitrogen was then stopped and the reactor was blocked in at a pressure of 1.5 psia. An initial charge of PO was charged to the reactor over several minutes. After 10 minutes the pressure in the reactor decreased indicating that the DMC catalyst was active. The PO and EO were started and set at rates of 23 g/min for PO and 2.6 g/min for EO (equivalent to a 2 hour residence time and a feed ratio of 90% PO and 10% EO). After establishing the oxide feed, a feed containing glycerin with 877 ppm of DMC catalyst and 75 ppm of phosphoric acid was started at a rate of 4.1 g/min. The DMC catalyst was added to the glycerin as a dry powder and remained dispersed in the glycerin by constant agitation of the glycerin/DMC catalyst feed vessel. The glycerin/catalyst feed line can also have constant recirculation between the reactor feed point and the glycerin/catalyst feed vessel to eliminate settling of the catalyst in the feed line. The DMC concentration in the glycerin is sufficient to provide 120 ppm in the final product. When the pressure in the reactor reached 47 psia, a valve at the top of the reactor was opened to a back pressure regulator and the contents of the liquid full reactor were allowed to flow out of the reactor. The polyether passed through a steam heated section of pipe before being collected in a heated and stirred jacketed vessel. After approximately 8 hours of line-out, collection of the final product was started. The reaction continued for 23 hours at which point the reaction was stopped. A sample of the inhibited, collected product had a hydroxyl number of 243 mg KOH/g and a viscosity of 261 cst.

GS11: A 700 MW (238 OH#), glycerin based polyether made with a double metal cyanide catalyst prepared according to the procedure in U.S. Pat. No. 5,482,908 and containing 12.8% EO (85/15 PO/EO feed ratio from a 700 MW all-PO starter and an 8 build ratio) was charged to reactor (2500 g) along with a double metal cyanide catalyst prepared according to the procedure in U.S. Pat. No. 5,482,908 (1.2 g). This mixture was heated to 130° C. with nitrogen stripping of the 700 MW polyether-catalyst blend. Propylene oxide (170 g) and ethylene oxide (30 g) were charged to activate the catalyst. After activation, the reactor temperature was maintained at 130° C. and introduction of propylene oxide (ramp to 55.5 g/min) and ethylene oxide (ramp to 9.8 g/min) was begun. The oxide feed ratio of 85% PO and 15% EO was maintained for the entire feed. After 4.2% of the total oxide feed was completed, glycerin (10.1 g/min) was introduced into the reactor. After 87% of the alkoxylation was completed, the glycerin feed ended (2279 g glycerin). The propylene oxide and ethylene oxide continued feeding until reaching their target weights (12938 g for PO and 2283 g for EO). The oxide was allowed to cookout at reaction temperature for 30 minutes. The final polyether product was stripped with nitrogen and vacuum before being discharged from the reactor. The final product was inhibited with BHT or equivalent. The final product had a hydroxyl number of 244 and a viscosity of 252 cst.

GS12: A 700 MW (238 OH#) all-PO, glycerin based polyether was charged to reactor (2500 g) along with a double metal cyanide catalyst prepared according to the procedure in U.S. Pat. No. 5,482,908 (1.2 g). This mixture was heated to 130° C. with nitrogen stripping of the 700 MW polyether-catalyst blend. Propylene oxide (160 g) and ethylene oxide (40 g) were charged to activate the catalyst. After activation, the reactor temperature was maintained at 130° C. and introduction of propylene oxide (ramp to 85.8 g/min) and ethylene oxide (ramp to 21.5 g/min) was begun. The oxide feed ratio of 80% PO and 20% EO was maintained for the entire feed. After 2.5% of the total oxide feed was completed, glycerin (14.1 g/min) was introduced into the reactor. After 93% of the alkoxylation was completed, the glycerin feed ended (2279 g glycerin). The propylene oxide and ethylene oxide continued feeding until reaching their target weights (12177 g for PO and 3044 g for EO). The oxide was allowed to cookout at reaction temperature for 30 minutes. The final polyether product was stripped with nitrogen and vacuum before being discharged from the reactor. The final product was inhibited with BHT or equivalent. The final product had a hydroxyl number of 241 and a viscosity of 244 cst.

GS13: A 700 MW (238 OH#) all-PO, glycerin based polyether was charged to reactor (2500 g) along with a double metal cyanide catalyst prepared according to the procedure in U.S. Pat. No. 5,482,908 (1.2 g). This mixture was heated to 130° C. with nitrogen stripping of the 700 MW polyether-catalyst blend. Propylene oxide (160 g) and ethylene oxide (40 g) were charged to activate the catalyst. After activation, the reactor temperature was maintained at 130° C. and introduction of propylene oxide (ramp to 52.3 g/min) and ethylene oxide (ramp to 13.1 g/min) was begun. The oxide feed ratio of 80% PO and 20% EO was maintained for the entire feed. After 2.5% of the total oxide feed was completed, glycerin (8.6 g/min) was introduced into the reactor. After 93% of the alkoxylation was completed, the glycerin feed ended (2279 g glycerin). The propylene oxide and ethylene oxide continued feeding until reaching their target weights (12177 g for PO and 3044 g for EO). The oxide was allowed to cookout at reaction temperature for 30 minutes. The final polyether product was stripped with nitrogen and vacuum before being discharged from the reactor. The final product was inhibited with BHT or equivalent. The final product had a hydroxyl number of 239 and a viscosity of 243 cst.

GS14: A 700 MW (238 OH#) all-PO, glycerin based polyether was charged to reactor (2500 g) along with a double metal cyanide catalyst prepared according to the procedure in U.S. Pat. No. 5,482,908 (1.2 g). This mixture was heated to 130° C. with nitrogen stripping of the 700 MW polyether-catalyst blend. Propylene oxide (160 g) and ethylene oxide (40 g) were charged to activate the catalyst. After activation, the reactor temperature was maintained at 130° C. and introduction of propylene oxide (ramp to 52.3 g/min) and ethylene oxide (ramp to 13.1 g/min) was begun. The oxide feed ratio of 80% PO and 20% EO was maintained for the entire feed. After 4.2% of the total oxide feed was completed, glycerin (9.5 g/min) was introduced into the reactor. After 87% of the alkoxylation was completed, the glycerin feed ended (2279 g glycerin). The propylene oxide and ethylene oxide continued feeding until reaching their target weights (12177 g for PO and 3044 g for EO). The oxide was allowed to cookout at reaction temperature for 30 minutes. The final polyether product was stripped with nitrogen and vacuum before being discharged from the reactor. The final product was inhibited with BHT or equivalent. The final product had a hydroxyl number of 242 and a viscosity of 246 cst.

GS15: A 700 MW (238 OH#) all-PO, glycerin based polyether was charged to reactor (2500 g) along with a double metal cyanide catalyst prepared according to the procedure in U.S. Pat. No. 5,482,908 (1.2 g). This mixture was heated to 130° C. with nitrogen stripping of the 700 MW polyether-catalyst blend. Propylene oxide (160 g) and ethylene oxide (40 g) were charged to activate the catalyst. After activation, the reactor temperature was maintained at 130° C. and introduction of propylene oxide (ramp to 52.3 g/min) and ethylene oxide (ramp to 13.1 g/min) was begun. The oxide feed ratio of 80% PO and 20% EO was maintained for the entire feed. After 4.2% of the total oxide feed was completed, glycerin (9.5 g/min) was introduced into the reactor. After 87% of the alkoxylation was completed, the glycerin feed ended (2279 g glycerin). The propylene oxide and ethylene oxide continued feeding until reaching their target weights (12177 g for PO and 3044 g for EO). The oxide was allowed to cookout at reaction temperature for 30 minutes. The final polyether product was stripped with nitrogen and vacuum before being discharged from the reactor. The final product was inhibited with BHT or equivalent. The final product had a hydroxyl number of 249 and a viscosity of 249 cst.

GS16: A 700 MW (238 OH#), glycerin based polyether made with a double metal cyanide catalyst prepared according to the procedure in U.S. Pat. No. 5,482,908 and containing 15.1% EO (80/20 PO/EO feed ratio from a 700 MW all-PO starter and an 8 build ratio) was charged to reactor (2500 g) along with a double metal cyanide catalyst prepared according to the procedure in U.S. Pat. No. 5,482,908 (1.8 g). This mixture was heated to 130° C. with nitrogen stripping of the 700 MW polyether-catalyst blend. Propylene oxide (160 g) and ethylene oxide (40 g) were charged to activate the catalyst. After activation, the reactor temperature was maintained at 130° C. and introduction of propylene oxide (ramp to 70.2 g/min) and ethylene oxide (ramp to 17.5 g/min) was begun. The oxide feed ratio of 80% PO and 20% EO was maintained for the entire feed. After 3.3% of the total oxide feed was completed, glycerin (16.7 g/min) was introduced into the reactor. After 87% of the alkoxylation was completed, the glycerin feed ended (2394 g glycerin). The propylene oxide and ethylene oxide continued feeding until reaching their target weights (12088 g for PO and 3018 g for EO). The oxide was allowed to cookout at reaction temperature for 30 minutes. The final polyether product was stripped with nitrogen and vacuum before being discharged from the reactor. The final product was inhibited with BHT or equivalent. The final product had a hydroxyl number of 252 and a viscosity of 244 cst.

GS17: A 700 MW (238 OH#) all-PO, glycerin based polyether was charged to reactor (2500 g) along with a double metal cyanide catalyst prepared according to the procedure in U.S. Pat. No. 5,482,908 (1.2 g). This mixture was heated to 130° C. with nitrogen stripping of the 700 MW polyether-catalyst blend. Propylene oxide (140 g) and ethylene oxide (60 g) were charged to activate the catalyst. After activation, the reactor temperature was maintained at 130° C. and introduction of propylene oxide (ramp to 75.1 g/min) and ethylene oxide (ramp to 32.2 g/min) was begun. The oxide feed ratio of 70% PO and 30% EO was maintained for the entire feed. After 2.5% of the total oxide feed was completed, glycerin (12.4 g/min) was introduced into the reactor. After 93% of the alkoxylation was completed, the glycerin feed ended (2279 g glycerin). The propylene oxide and ethylene oxide continued feeding until reaching their target weights (10655 g for PO and 4566 g for EO). The oxide was allowed to cookout at reaction temperature for 30 minutes. The final polyether product was stripped with nitrogen and vacuum before being discharged from the reactor. The final product was inhibited with BHT or equivalent. The final product had a hydroxyl number of 238 and a viscosity of 235 cst. Comparative Glycerin Starters CGS1-CGS4 were prepared as follows:

CGS1: A 480 MW (350 OH#) all-PO, glycerin based polyether was charged to reactor (2404 g) along with a double metal cyanide catalyst prepared according to the procedure in U.S. Pat. No. 5,482,908 (1.1 g). This mixture was heated to 130° C. with nitrogen stripping of the 480 MW polyether-catalyst blend. Propylene oxide (192 g) was charged to activate the catalyst. After activation, the reactor temperature was maintained at 130° C. and introduction of propylene oxide (ramp to 40.5 g/min) was begun. The propylene oxide continued feeding until reaching its target weight (9496 g for PO). The oxide was allowed to cookout at reaction temperature for 30 minutes. The final polyether product was stripped with nitrogen and vacuum before being discharged from the reactor. The final product was inhibited with BHT or equivalent. The final product had a hydroxyl number of 71.2 and a viscosity of 540 cst. This sample represents making half of the propoxylation of the final long chain active polyether, before the EO cap or tip with DMC catalyst.

CGS2: A 480 MW (350 OH#) all-PO, glycerin based polyether was charged to reactor (2392 g) along with a double metal cyanide catalyst prepared according to the procedure in U.S. Pat. No. 5,482,908 (4.26 g). This mixture was heated to 130° C. with nitrogen stripping of the 480 MW polyether-catalyst blend. Propylene oxide (191 g) was charged to activate the catalyst. After activation, the reactor temperature was maintained at 130° C. and introduction of propylene oxide (ramp to 64.5 g/min) was begun. The propylene oxide continued feeding until reaching its target weight (18908 g for PO). The oxide was allowed to cookout at reaction temperature for 30 minutes. The final polyether product was stripped with nitrogen and vacuum before being discharged from the reactor. The final product was inhibited with BHT or equivalent. The final product had a hydroxyl number of 39.9 and a viscosity of 907 cst. This sample represents making 95% of the propoxylation of the final long chain active polyether, before the EO cap or tip with DMC catalyst.

CGS3: A 2370 MW (71 OH#), all-PO glycerin based polyether made with a double metal cyanide catalyst prepared according to the procedure in U.S. Pat. No. 5,482,908 (8 build ratio) was charged to reactor (2500 g) along with a double metal cyanide catalyst prepared according to the procedure in U.S. Pat. No. 5,482,908 (0.6 g). This mixture was heated to 130° C. with nitrogen stripping of the 2370 MW polyether-catalyst blend. Propylene oxide (100 g) was charged to activate the catalyst. After activation, the reactor temperature was maintained at 130° C. and introduction of propylene oxide (ramp to 72.7 g/min) was begun. After 3.7% of the total PO was completed, glycerin (3.5 g/min) was introduced into the reactor. After 88% of the alkoxylation was completed, the glycerin feed ended (677 g glycerin). The propylene oxide continued feeding until reaching its target weight (16823 g for PO). The oxide was allowed to cookout at reaction temperature for 30 minutes. The final polyether product was stripped with nitrogen and vacuum before being discharged from the reactor. The final product was inhibited with BHT or equivalent. The final product had a hydroxyl number of 70.5 and a viscosity of 501 cst.

CGS4: A 4300 MW (39 OH#), all-PO glycerin based polyether made with a double metal cyanide catalyst prepared according to the procedure in U.S. Pat. No. 5,482,908 (8 build ratio) was charged to reactor (2500 g) along with a double metal cyanide catalyst prepared according to the procedure in U.S. Pat. No. 5,482,908 (0.6 g). This mixture was heated to 130° C. with nitrogen stripping of the 4300 MW polyether-catalyst blend. Propylene oxide (100 g) was charged to activate the catalyst. After activation, the reactor temperature was maintained at 130° C. and introduction of propylene oxide (ramp to 74 g/min) was begun. After 3.7% of the total PO was completed, glycerin (1.9 g/min) was introduced into the reactor. After 88% of the alkoxylation was completed, the glycerin feed ended (377 g glycerin). The propylene oxide continued feeding until reaching its target weight (17123 g for PO). The oxide was allowed to cookout at reaction temperature for 30 minutes. The final polyether product was stripped with nitrogen and vacuum before being discharged from the reactor. The final product was inhibited with BHT or equivalent. The final product had a hydroxyl number of 38.5 and a viscosity of 963 cst.

Preparation of Sorbitol Starters:

LS1: KOH catalyzed all-PO polyether started with sorbitol having a final hydroxyl number of 200 mg KOH/g.

CLS2: KOH catalyzed all-PO polyether started with LS1 having a final hydroxyl number of 71 mg KOH/g.

CLS3: KOH catalyzed all-PO polyether started with LS1 having a final hydroxyl number of 39 mg KOH/g.

Preparation of KOH Polyethers with a EO Cap:

General Procedure: A 35 liter pressure reactor was equipped with agitator, multiple feed systems, process control system, heat/cooling capability, safety relief system and vacuum capability. The reactor system was purged with nitrogen and evacuated, and the starters were charged to the reactor along with KOH catalyst to give a final concentration of 0.2 to 0.5% catalyst in the product. The glycerin and sorbitol starters were mixed to a starter functionality of 3.5. The starter/catalyst mixture was inerted with nitrogen and heated to 130° C. The system was vacuum stripped for at 130° C. with a nitrogen purge to remove water. The reaction contents were cooled to 105° C. to 120° C. and the PO flow was started. The PO feed continued for 6-10 hours. The PO was allowed to fully cookout at temperatures from 105° C. to 140° C. The reactor was inerted with 20 psia nitrogen for the pure EO cap. The EO was fed in over 2 hours at 115° C. to 130° C. After the EO was fully cooked out, the final product was vacuum stripped for 30 minutes at reaction temperature. The KOH was removed using a weak acid cation exchange resin, or was neutralized with sulfuric acid and filtered.

The above procedure was used to prepare GSP1 through GSP17, and CGSP1-CGSP4.

Control Polyol 1 (CP1): a KOH catalyzed polyether with all-PO followed by a 16% EO cap and having a hydroxyl number of 31.5 mg KOH/g.

Control Polyol 2 (CP2): a KOH catalyzed polyether with all-PO followed by a 17.5% EO cap and having a hydroxyl number of 31.5 mg KOH/g.

GSP1: a KOH catalyzed polyether with all-PO followed by a 16% EO cap made using GS1 as the glycerin starter and LS1 as the sorbitol starter and having a hydroxyl number of 31.4 mg KOH/g.

GSP2: a KOH catalyzed polyether with all-PO followed by a 16% EO cap made using GS2 as the glycerin starter and LS1 as the sorbitol starter and having a hydroxyl number of 31.2 mg KOH/g.

GSP3: a KOH catalyzed polyether with all-PO followed by a 16% EO cap made using GS3 as the glycerin starter and LS1 as the sorbitol starter and having a hydroxyl number of 29.9 mg KOH/g.

GSP3A: a KOH catalyzed polyether with all-PO followed by a 17.5% EO cap made using GS3 as the glycerin starter and LS1 as the sorbitol starter and having a hydroxyl number of 31.7 mg KOH/g.

GSP3B: a KOH catalyzed polyether with all-PO followed by a 17.5% EO cap made using GS3 as the glycerin starter and LS1 as the sorbitol starter and having a hydroxyl number of 32.1 mg KOH/g.

GSP3C: a KOH catalyzed polyether with all-PO followed by a 17.5% EO cap made using GS3 as the glycerin starter and LS1 as the sorbitol starter and having a hydroxyl number of 33.8 mg KOH/g.

GSP4: a KOH catalyzed polyether with all-PO followed by a 17.5% EO cap made using GS4 as the glycerin starter and LS1 as the sorbitol starter and having a hydroxyl number of 32 mg KOH/g.

GSP5: a KOH catalyzed polyether with all-PO followed by a 17.5% EO cap made using GS5 as the glycerin starter and LS1 as the sorbitol starter and having a hydroxyl number of 32 mg KOH/g.

GSP6: a KOH catalyzed polyether with all-PO followed by a 17.5% EO cap made using GS6 as the glycerin starter and LS1 as the sorbitol starter and having a hydroxyl number of 31.1 mg KOH/g.

GSP7: a KOH catalyzed polyether with all-PO followed by a 17.5% EO cap made using GS7 as the glycerin starter and LS1 as the sorbitol starter and having a hydroxyl number of 31 mg KOH/g.

GSP8: a KOH catalyzed polyether with all-PO followed by a 17.5% EO cap made using GS8 as the glycerin starter and LS1 as the sorbitol starter and having a hydroxyl number of 30.9 mg KOH/g.

GSP9: a KOH catalyzed polyether with all-PO followed by a 17.5% EO cap made using GS9 as the glycerin starter and LS1 as the sorbitol starter and having a hydroxyl number of 32 mg KOH/g.

GSP10: a KOH catalyzed polyether with all-PO followed by a 17.5% EO cap made using GS10 as the glycerin starter and LS1 as the sorbitol starter and having a hydroxyl number of 31.5 mg KOH/g.

GSP11: a KOH catalyzed polyether with all-PO followed by a 17.5% EO cap made using GS11 as the glycerin starter and LS1 as the sorbitol starter having a hydroxyl number of 31.2 mg KOH/g.

GSP12: a KOH catalyzed polyether with all-PO followed by a 17.5% EO cap made using GS12 as the glycerin starter and LS1 as the sorbitol starter and having a hydroxyl number of 31.9 mg KOH/g.

GSP13: a KOH catalyzed polyether with all-PO followed by a 17.5% EO cap made using GS13 as the glycerin starter and LS1 as the sorbitol starter and having a hydroxyl number of 32.4 mg KOH/g.

GSP14: a KOH catalyzed polyether with all-PO followed by a 17.5% EO cap made using GS14 as the glycerin starter and LS1 as the sorbitol starter and having a hydroxyl number of 31.8 mg KOH/g.

GSP15: a KOH catalyzed polyether with all-PO followed by a 17.5% EO cap made using GS15 as the glycerin starter and LS1 as the sorbitol starter and having a hydroxyl number of 31.9 mg KOH/g.

GSP16: a KOH catalyzed polyether with all-PO followed by a 17.5% EO cap made using GS16 as the glycerin starter and LS1 as the sorbitol starter and having a hydroxyl number of 31.8 mg KOH/g.

GSP17: a KOH catalyzed polyether with all-PO followed by a 17.5% EO cap made using GS17 as the glycerin starter and LS1 as the sorbitol starter and having a hydroxyl number of 32.1 mg KOH/g.

CGSP1: a KOH catalyzed polyether with all-PO followed by a 17.5% EO cap made using CGS1 as the glycerin starter and CLS2 as the sorbitol starter and having a hydroxyl number of 29.9 mg KOH/g.

CGSP2: a KOH catalyzed polyether with all-PQ followed by a 17.5% EO cap made using CGS2 as the glycerin starter and CLS3 as the sorbitol starter and having a hydroxyl number of 30.7 mg KOH/g.

CGSP3: a KOH catalyzed polyether with all-PO followed by a 17.5% EO cap made using CGS3 as the glycerin starter and CLS2 as the sorbitol starter and having a hydroxyl number of 30.3 mg KOH/g.

CGSP4: a KOH catalyzed polyether with all-PO followed by a 17.5% EO cap made using CGS4 as the glycerin starter and CLS3 as the sorbitol starter and having a hydroxyl number of 30.2 mg KOH/g.

PMPO1: a polymer polyol containing about 43% solids by weight styrene/acrylonitrile solids dispersed in a glycerin started polyether with a 36 hydroxyl number and 20% ethylene oxide cap Isocyanate A: toluene diisocyanate having an NCO group content of about 48% and comprising 80% by weight of the 2,4-isomer and 20% by weight of the 2,6-isomer DEOA: diethanolamine DEOA-LF: a blend of 85% by weight diethanolamine and 15% by weight water.

Surfactant 1: a silicone surfactant, commercially available as Dabco DC 5043

Surfactant 2: a silicone surfactant, commercially available as Dabco DC 5169

Surfactant 3: a silicone surfactant, commercially available as Dabco DC 5164

Catalyst 1: bis[2-dimethylaminoethyl]ether (70 wt. %) in dipropylene glycol (30 wt. %), a blowing catalyst commercially available as Niax A-1

Catalyst 2: a mixture of triethylene diamine and dipropylene glycol, commercially available as Dabco 33 LV Catalyst 3: amine gel catalyst, commercially available as Niax A-33

Foaming Description for FTC (Force-to-Crush) and Physical Property Foams:

All the formulation ingredients except the isocyanate were added to a one-half gallon cylindrical container fitted with baffles. The contents were mixed at 3700 rpm for 60 seconds with an agitator having two turbine impellers. The mixture was then degassed for 60 seconds. The isocyanate was added to the container and the contents were mixed for 5 seconds. The mixture was then poured into a preconditioned mold (15×15×2"), preheated to 65° C., while shaking the mixing container to ensure that the required amount was transferred to the mold. The mold was immediately clamped and sealed. The foam reaction proceeded for the prescribed demold time of 4 to 5 minutes, after which the foam was demolded. The foam was aged for seven days at room temperature prior to measuring physical and mechanical properties. See Tables 1-5.

The physical or mechanical properties were measured per the procedures prescribed in ASTM D3574-05 unless noted otherwise below. Wet Compression Set (50%) was determined by measuring the height of three 2×2×1" specimens per sample, compressing to 50% of their height, holding for 22 hours in the compressed state at 50° C. and 95% relative humidity, removing the specimens from the compression fixture and allowing the specimens to recover for 30 minutes at room temperature, remeasuring the height and then determining the average percent height loss relative to the original height. Air flow was measured on 2"×2"×1" thick specimens using an AMSCOR Model 1377 Foam Porosity Instrument. See Tables 11-14.

Foaming Description for Free Rise Foams:

All the formulation ingredients except the isocyanate were added to a one-half gallon cylindrical container fitted with baffles. The contents were mixed at 3700 rpm for 55 seconds with an agitator having two turbine impellers. The isocyanate was added to the container and the contents were mixed for 5 seconds. The mixture was then poured into a 5 gallon bucket while shaking the mixing container to ensure that the required amount was transferred to the bucket. The rise profile of the foam was monitored and the amount of settling was recorded. The foam was visually observed for shrinkage in the bucket and detachment from the walls. See Tables 6-10.

TABLE 1

Processing of Active Polyether using DMC Propoxylates as Starters

| Component | Ex. 1 | Ex. 2 | Ex. 3 | Ex. 4 |
|---|---|---|---|---|
| CP1 | 85 | | | |
| GSP1 | | 85 | | |
| GSP2 | | | 85 | |
| GSP3 | | | | 85 |
| PMPO1 | 15 | 15 | 15 | 15 |
| Water | 4.08 | 4.08 | 4.08 | 4.08 |
| DEOA | 1.38 | 1.38 | 1.38 | 1.38 |
| Surfactant 1 | 1 | 1 | 1 | 1 |
| Catalyst 2 | 0.32 | 0.32 | 0.32 | 0.32 |
| Catalyst 1 | 0.08 | 0.08 | 0.08 | 0.08 |
| Isocyanate A | 49.23 | 49.23 | 49.23 | 49.23 |
| INDEX | 100 | 100 | 100 | 100 |
| FTC Initial Cycle | 254 | 237 | 229 | 227 |
| FTC Intermediate Cycle | 138 | 125 | 124 | 113 |
| FTC Final | 54 | 48 | 50 | 60 |
| Cell Structure | Normal | Normal | Normal | Normal |

TABLE 2

Processing of Active Polyether using DMC Propoxylates as Starters

| Component | Ex. 5 | Ex. 6 | Ex. 7 | Ex. 8 | Ex. 9 | Ex. 10 | Ex. 11 |
|---|---|---|---|---|---|---|---|
| CP2 | 85 | | | | | | |
| GSP3A | | 85 | | | | | |
| GSP3B | | | 85 | | | | |
| GSP3C | | | | 85 | | | |
| GSP4 | | | | | 85 | | |
| GSP5 | | | | | | 85 | |
| GSP6 | | | | | | | 85 |
| PMPO1 | 15 | 15 | 15 | 15 | 15 | 15 | 15 |
| Water | 4.08 | 4.08 | 4.08 | 4.08 | 4.08 | 4.08 | 4.08 |
| DEOA | 1.38 | 1.38 | 1.38 | 1.38 | 1.38 | 1.38 | 1.38 |
| Surfactant 1 | 1 | 1 | 1 | 1 | 1 | 1 | 1 |
| Catalyst 2 | 0.32 | 0.32 | 0.32 | 0.32 | 0.32 | 0.32 | 0.32 |
| Catalyst 1 | 0.08 | 0.08 | 0.08 | 0.08 | 0.08 | 0.08 | 0.08 |
| Isocyanate A | 49.23 | 49.23 | 49.23 | 49.23 | 49.23 | 49.23 | 49.23 |
| INDEX | 100 | 100 | 100 | 100 | 100 | 100 | 100 |
| FTC Initial Cycle | 242 | 278 | 248 | 244 | 252 | 253 | 250 |
| FTC Intermediate Cycle | 102 | 112 | 101 | 105 | 100 | 108 | 98 |
| FTC Final | 52 | 54 | 52 | 54 | 50 | 55 | 48 |
| Cell Structure | Normal | Normal | Normal | Normal | Normal | Normal | Normal |

TABLE 3

Processing of Active Polyether using DMC Propoxylates as Starters

| Component | Ex. 5 | Ex. 12 | Ex. 13 | Ex. 14 | Ex. 15 | Ex. 16 |
|---|---|---|---|---|---|---|
| CP2 | 85 | | | | | |
| GSP7 | | 85 | | | | |
| GSP8 | | | 85 | | | |
| GSP9 | | | | 85 | | |
| GSP10 | | | | | 85 | |
| GSP11 | | | | | | 85 |
| PMPO1 | 15 | 15 | 15 | 15 | 15 | 15 |
| Water | 4.08 | 4.08 | 4.08 | 4.08 | 4.08 | 4.08 |
| DEOA | 1.38 | 1.38 | 1.38 | 1.38 | 1.38 | 1.38 |
| Surfactant 1 | 1 | 1 | 1 | 1 | 1 | 1 |
| Catalyst 2 | 0.32 | 0.32 | 0.32 | 0.32 | 0.32 | 0.32 |
| Catalyst 1 | 0.08 | 0.08 | 0.08 | 0.08 | 0.08 | 0.08 |
| Isocyanate A | 49.23 | 49.23 | 49.23 | 49.23 | 49.23 | 49.23 |
| INDEX | 100 | 100 | 100 | 100 | 100 | 100 |
| FTC Initial Cycle | 242 | 249 | 250 | 271 | 216 | 262 |
| FTC Intermediate Cycle | 102 | 106 | 104 | 113 | 80 | 110 |
| FTC Final | 52 | 56 | 56 | 57 | 44 | 57 |
| Cell Structure | Normal | Normal | Normal | Normal | Normal | Normal |

TABLE 4

Processing of Active Polyether using DMC Propoxylates as Starters

| Component | Ex. 5 | Ex. 17 | Ex. 18 | Ex. 19 | Ex. 20 | Ex. 21 | Ex. 22 |
|---|---|---|---|---|---|---|---|
| CP2 | 85 | | | | | | |
| GSP12 | | 85 | | | | | |
| GSP13 | | | 85 | | | | |
| GSP14 | | | | 85 | | | |
| GSP15 | | | | | 85 | | |
| GSP16 | | | | | | 85 | |
| GSP17 | | | | | | | 85 |
| PMPO1 | 15 | 15 | 15 | 15 | 15 | 15 | 15 |
| Water | 4.08 | 4.08 | 4.08 | 4.08 | 4.08 | 4.08 | 4.08 |
| DEOA | 1.38 | 1.38 | 1.38 | 1.38 | 1.38 | 1.38 | 1.38 |
| Surfactant 1 | 1 | 1 | 1 | 1 | 1 | 1 | 1 |
| Catalyst 2 | 0.32 | 0.32 | 0.32 | 0.32 | 0.32 | 0.32 | 0.32 |
| Catalyst 1 | 0.08 | 0.08 | 0.08 | 0.08 | 0.08 | 0.08 | 0.08 |
| Isocyanate A | 49.23 | 49.23 | 49.23 | 49.23 | 49.23 | 49.23 | 49.23 |
| INDEX | 100 | 100 | 100 | 100 | 100 | 100 | 100 |
| FTC Initial Cycle | 242 | 268 | 251 | 260 | 260 | 235 | 258 |
| FTC Intermediate Cycle | 102 | 119 | 107 | 109 | 112 | 93 | 110 |
| FTC Final | 52 | 63 | 58 | 56 | 59 | 48 | 58 |
| Cell Structure | Normal | Normal | Normal | Normal | Normal | Normal | Normal |

TABLE 5

Processing of Active Polyether using DMC Propoxylates as Starters

| Component | Ex. 5 | Comp. Ex. 1 | Comp. Ex. 2 | Comp. Ex. 3 | Comp. Ex. 4 |
|---|---|---|---|---|---|
| CP2 | 85 | | | | |
| CGSP1 | | 85 | | | |
| CGSP2 | | | 85 | | |
| CGSP3 | | | | 85 | |
| CGSP4 | | | | | 85 |
| PMPO1 | 15 | 15 | 15 | 15 | 15 |
| Water | 4.08 | 4.08 | 4.08 | 4.08 | 4.08 |
| DEOA | 1.38 | 1.38 | 1.38 | 1.38 | 1.38 |
| Surfactant 1 | 1 | 1 | 1 | 1 | 1 |
| Catalyst 2 | 0.32 | 0.32 | 0.32 | 0.32 | 0.32 |
| Catalyst 1 | 0.08 | 0.08 | 0.08 | 0.08 | 0.08 |
| Isocyanate A | 49.23 | 49.23 | 49.23 | 49.23 | 49.23 |
| INDEX | 100 | 100 | 100 | 100 | 100 |
| FTC Initial Cycle | 242 | 357 | 392 | 75 | 55 |
| FTC Intermediate Cycle | 102 | 257 | 321 | 38 | 42 |
| FTC Final | 52 | 196 | 287 | 37 | 42 |
| Cell Structure | Normal | Fine, Shrinkage | Normal, Shrinkage | Coarse | Coarse, internal voids |

TABLE 6

Processing of Active Polyether using DMC Propoxylates as Starters

| Component | Ex. 23 | Ex. 24 | Ex. 25 | Ex. 26 |
|---|---|---|---|---|
| CP1 | 55 | | | |
| GSP1 | | 55 | | |
| GSP2 | | | 55 | |
| GSP3 | | | | 55 |
| PMPO1 | 45 | 45 | 45 | 45 |
| Water | 4.08 | 4.08 | 4.08 | 4.08 |
| DEOA | 1.38 | 1.38 | 1.38 | 1.38 |
| Surfactant 1 | 1 | 1 | 1 | 1 |
| Catalyst 2 | 0.32 | 0.32 | 0.32 | 0.32 |
| Catalyst 1 | 0.08 | 0.08 | 0.08 | 0.08 |
| Isocyanate A | 53.57 | 53.57 | 53.57 | 53.57 |
| INDEX | 110 | 110 | 110 | 110 |
| Settle (%) | 5.4 | 4.8 | 7.4 | 11.1 |

TABLE 7

Processing of Active Polyether using DMC Propoxylates as Starters

| Component | Ex. 27 | Ex. 28 | Ex. 29 | Ex. 30 | Ex. 31 | Ex. 32 | Ex. 33 |
|---|---|---|---|---|---|---|---|
| CP2 | 55 | | | | | | |
| GSP3A | | 55 | | | | | |
| GSP3B | | | 55 | | | | |
| GSP3C | | | | 55 | | | |
| GSP4 | | | | | 55 | | |
| GSP5 | | | | | | 55 | |
| GSP6 | | | | | | | 55 |
| PMPO1 | 45 | 45 | 45 | 45 | 45 | 45 | 45 |
| Water | 4.08 | 4.08 | 4.08 | 4.08 | 4.08 | 4.08 | 4.08 |
| DEOA | 1.38 | 1.38 | 1.38 | 1.38 | 1.38 | 1.38 | 138 |
| Surfactant 1 | 1 | 1 | 1 | 1 | 1 | 1 | 1 |
| Catalyst 2 | 0.32 | 0.32 | 0.32 | 0.32 | 0.32 | 0.32 | 0.32 |
| Catalyst 1 | 0.08 | 0.08 | 0.08 | 0.08 | 0.08 | 0.08 | 0.08 |
| Isocyanate A | 53.57 | 53.57 | 53.57 | 53.57 | 53.57 | 53.57 | 53.57 |
| INDEX | 110 | 110 | 110 | 110 | 110 | 110 | 110 |
| Settle (%) | 5.4 | 3.4 | 5.9 | 10.7 | 7.8 | 10.9 | 10.7 |

TABLE 8

Processing of Active Polyether using DMC Propoxylates as Starters

| Component | Ex. 27 | Ex. 34 | Ex. 35 | Ex. 36 | Ex. 37 | Ex. 38 |
|---|---|---|---|---|---|---|
| CP2 | 55 | | | | | |
| GSP7 | | 55 | | | | |
| GSP8 | | | 55 | | | |
| GSP9 | | | | 55 | | |
| GSP10 | | | | | 55 | |
| GSP11 | | | | | | 55 |
| PMPO1 | 45 | 45 | 45 | 45 | 45 | 45 |
| Water | 4.08 | 4.08 | 4.08 | 4.08 | 4.08 | 4.08 |
| DEOA | 1.38 | 1.38 | 1.38 | 1.38 | 1.38 | 1.38 |
| Surfactant 1 | 1 | 1 | 1 | 1 | 1 | 1 |
| Catalyst 2 | 0.32 | 0.32 | 0.32 | 0.32 | 0.32 | 0.32 |
| Catalyst 1 | 0.08 | 0.08 | 0.08 | 0.08 | 0.08 | 0.08 |
| Isocyanate A | 53.57 | 53.57 | 53.57 | 53.57 | 53.57 | 53.57 |
| INDEX | 110 | 110 | 110 | 110 | 110 | 110 |
| Settle (%) | 5.4 | 8.2 | 8.7 | 4.7 | 7.6 | 9.6 |

TABLE

Processing of Active Polyether using DMC Propoxylates as Starters

| Component | Ex. 27 | Ex. 39 | Ex. 40 | Ex. 41 | Ex. 42 | Ex. 43 | Ex. 44 |
|---|---|---|---|---|---|---|---|
| CP2 | 55 | | | | | | |
| GSP12 | | 55 | | | | | |
| GSP13 | | | 55 | | | | |
| GSP14 | | | | 55 | | | |
| GSP15 | | | | | 55 | | |
| GSP16 | | | | | | 55 | |
| GSP17 | | | | | | | 55 |
| PMPO1 | 45 | 45 | 45 | 45 | 45 | 45 | 45 |
| Water | 4.08 | 4.08 | 4.08 | 4.08 | 4.08 | 4.08 | 4.08 |
| DEOA | 1.38 | 1.38 | 1.38 | 1.38 | 1.38 | 1.38 | 1.38 |
| Surfactant 1 | 1 | 1 | 1 | 1 | 1 | 1 | 1 |
| Catalyst 2 | 0.32 | 0.32 | 0.32 | 0.32 | 0.32 | 0.32 | 0.32 |
| Catalyst 1 | 0.08 | 0.08 | 0.08 | 0.08 | 0.08 | 0.08 | 0.08 |
| Isocyanate A | 53.57 | 53.57 | 53.57 | 53.57 | 53.57 | 53.57 | 53.57 |
| INDEX | 110 | 110 | 110 | 110 | 110 | 110 | 110 |
| Settle (%) | 5.4 | 5.3 | 6.1 | 7 | 6.8 | 5.5 | 6 |

TABLE 10

Processing of Active Polyether using DMC Propoxylates as Starters

| Component | Ex. 27 | Comp. Ex. 5 | Comp. Ex. 6 | Comp. Ex. 7 | Comp. Ex. 8 |
|---|---|---|---|---|---|
| CP2 | 55 | | | | |
| CGSP1 | | 55 | | | |
| CGSP2 | | | 55 | | |
| CGSP3 | | | | 55 | |
| CGSP4 | | | | | 55 |
| PMPO1 | 45 | 45 | 45 | 45 | 45 |
| Water | 4.08 | 4.08 | 4.08 | 4.08 | 4.08 |
| DEOA | 1.38 | 1.38 | 1.38 | 1.38 | 1.38 |
| Surfactant 1 | 1 | 1 | 1 | 1 | 1 |
| Catalyst 2 | 0.32 | 0.32 | 0.32 | 0.32 | 0.32 |
| Catalyst 1 | 0.08 | 0.08 | 0.08 | 0.08 | 0.08 |
| Isocyanate A | 53.57 | 53.57 | 53.57 | 53.57 | 53.57 |
| INDEX | 110 | 110 | 110 | 110 | 110 |
| Settle (%) | 5.4 | 0.7, Shrinkage | 0, Shrinkage | 1.4, Pruned | 0.3, Pruned |

The processing results in Tables 1-4 and 6-9 demonstrate that long chain active products made with glycerin based DMC starters that have molecular weights less than 1000 Da perform similar to all-KOH made products (i.e. control products). At starter molecular weights greater than 1000 Da, (Tables 5 and 10) products give foams that either shrink excessively or are considerably tighter than the all-KOH made products (i.e. control products).

TABLE 11

Physical Properties of Active Polyether using DMC Propoxylates as Starters

| | | Ex. 45 | Ex. 46 | Ex. 47 | Ex. 48 | Ex. 49 |
|---|---|---|---|---|---|---|
| Components | | | | | | |
| CP2 | | 80 | | | | |
| GSP4 | | | 80 | | | |
| GSP5 | | | | 80 | | |
| GSP10 | | | | | 80 | |
| GSP16 | | | | | | 80 |
| PMPO1 | | 20 | 20 | 20 | 20 | 20 |
| Water | | 3.27 | 3.27 | 3.27 | 3.27 | 3.27 |
| DEOA-LF | | 1.73 | 1.73 | 1.73 | 1.73 | 1.73 |
| Surfactant 1 | | 1.5 | 1.5 | 1.5 | 1.5 | 1.5 |
| Catalyst 3 | | 0.32 | 0.32 | 0.32 | 0.32 | 0.32 |
| Catalyst 1 | | 0.08 | 0.08 | 0.08 | 0.08 | 0.08 |
| Isocyanate A | | 42.6 | 42.6 | 42.6 | 42.6 | 42.6 |
| Index | | 100 | 100 | 100 | 100 | 100 |
| Properties: | | | | | | |
| Density | lb/ft$^3$ | 2.32 | 2.35 | 2.55 | 2.33 | 2.69 |
| Resilience | % | 66 | 66 | 68 | 61 | 69 |
| Air Flow | ft$^3$/min | 2.95 | 2.9 | 2.45 | 2.82 | 2.96 |
| IFD 25% | lb/50 in$^2$ | 30.91 | 30 | 28.92 | 28.87 | 30.52 |
| IFD 50% | | 54.05 | 52.67 | 51.42 | 50.88 | 53.11 |
| IFD 65% | | 81.31 | 79.78 | 79.29 | 78.11 | 81.04 |
| Return Val. @ 25% | % | 82.72 | 81.57 | 82.16 | 81.82 | 81.72 |
| S.F. 65%/25% | | 2.63 | 2.66 | 2.74 | 2.71 | 2.66 |
| CFD 50% | psi | 0.22 | 0.21 | 0.2 | 0.21 | 0.21 |
| Tensile Strength | psi | 16.33 | 16.82 | 15.78 | 17.23 | 17.72 |
| Elongation | % | 82.5 | 83.2 | 76.3 | 81.9 | 86.7 |
| ASTM Tear | pli | 1.11 | 1.13 | 1.03 | 1.11 | 1.03 |
| Compression Set 50% | % | 8.52 | 8.18 | 9.89 | 11.35 | 9.47 |

TABLE 11-continued

Physical Properties of Active Polyether using DMC Propoxylates as Starters

|  |  | Ex. 45 | Ex. 46 | Ex. 47 | Ex. 48 | Ex. 49 |
|---|---|---|---|---|---|---|
| HACS 50% | % | 19.35 | 19.37 | 19.53 | 19.71 | 16.22 |
| Wet Set 50% | % | 20.69 | 17.69 | 20.5 | 19.2 | 17.95 |

TABLE 12

Physical Properties of Active Polyether using DMC Propoxylates as Starters

|  |  | Ex. 50 | Ex. 51 | Ex. 52 | Ex. 53 |
|---|---|---|---|---|---|
| Components |  |  |  |  |  |
| CP2 |  | 85 |  |  |  |
| GSP3A |  |  | 85 |  |  |
| GSP6 |  |  |  | 85 |  |
| GSP9 |  |  |  |  | 85 |
| PMPO1 |  | 15 | 15 | 15 | 15 |
| Water |  | 4.08 | 4.08 | 4.08 | 4.08 |
| DEOA-LF |  | 1.38 | 1.38 | 1.38 | 1.38 |
| Surfactant 1 |  | 1 | 1 | 1 | 1 |
| Catalyst 3 |  | 0.32 | 0.32 | 0.32 | 0.32 |
| Catalyst 1 |  | 0.08 | 0.08 | 0.08 | 0.08 |
| Isocyanate A |  | 49.24 | 49.24 | 49.24 | 49.24 |
| Index |  | 100 | 100 | 100 | 100 |
| Properties: |  |  |  |  |  |
| Density |  | 2.06 | 1.95 | 2.27 | 2.03 |
| Resilience | lb/ft³ | 66 | 66 | 68 | 67 |
| Air Flow | ft³/min | 3.31 | 3.51 | 2.01 | 2.58 |
| IFD 25% | lb/50 in² | 28.4 | 28.4 | 29.03 | 3.69 |
| IFD 50% |  | 50.4 | 5.14 | 51.34 | 54.42 |
| IFD 65% |  | 77.33 | 76.69 | 78.26 | 82.63 |
| Return Val. @ 25% | % | 80.71 | 79.4 | 79.95 | 80.98 |
| S.F. 65%/25% |  | 2.72 | 2.7 | 2.7 | 2.69 |
| CFD 50% | psi | 0.2 | 0.21 | 0.2 | 0.21 |
| Tensile Strength | psi | 18.59 | 16.34 | 16.73 | 18.86 |
| Elongation | % | 119.6 | 115 | 121.4 | 97.02 |
| ASTM Tear | pli | 1.35 | 1.22 | 1.23 | 1.37 |
| Compression Set 50% | % | 10.68 | 10.55 | 12.16 | 7.99 |
| HACS 50% | % | 21.86 | 20.36 | 21.03 | 18.78 |
| Wet Set 50% | % | 22.42 | 23.61 | 24.18 | 19.96 |

TABLE 13

Physical Properties of Active Polyether using DMC Propoxylates as Starters

|  |  | Ex. 50 | Ex. 54 | Ex. 55 | Ex. 56 | Ex. 57 |
|---|---|---|---|---|---|---|
| Components |  |  |  |  |  |  |
| CP2 |  | 85 |  |  |  |  |
| GSP12 |  |  | 85 |  |  |  |
| GSP14 |  |  |  | 85 |  |  |
| GSP15 |  |  |  |  | 85 |  |
| GSP17 |  |  |  |  |  | 85 |
| PMPO1 |  | 15 | 15 | 15 | 15 | 15 |
| Water |  | 4.08 | 4.08 | 4.08 | 4.08 | 4.08 |
| DEOA-LF |  | 1.38 | 1.38 | 1.38 | 1.38 | 1.38 |
| Surfactant 1 |  | 1 | 1 | 1 | 1 | 1 |
| Catalyst 3 |  | 0.32 | 0.32 | 0.32 | 0.32 | 0.32 |
| Catalyst 1 |  | 0.08 | 0.08 | 0.08 | 0.08 | 0.08 |
| Isocyanate A |  | 49.24 | 49.24 | 49.24 | 49.24 | 49.24 |
| Index |  | 100 | 100 | 100 | 100 | 100 |
| Properties: |  |  |  |  |  |  |
| Density | lb/ft³ | 2.06 | 2 | 1.98 | 2.09 | 2.01 |
| Resilience | % | 66 | 67 | 68 | 68 | 65 |
| Air Flow | ft³/min | 3.31 | 3.38 | 2.92 | 2.65 | 3.22 |
| IFD 25% | lb/50 in² | 28.4 | 29.63 | 28.7 | 30.1 | 30.07 |
| IFD 50% |  | 50.4 | 52.19 | 51.15 | 54.18 | 52.72 |
| IFD 65% |  | 77.33 | 79.34 | 78.39 | 83.46 | 80.16 |
| Return Val. @ 25% | % | 80.71 | 80.55 | 80.86 | 81.85 | 80.55 |
| S.F. 65%/25% |  | 2.72 | 2.68 | 2.73 | 2.77 | 2.67 |
| CFD 50% | psi | 0.2 | 0.18 | 0.19 | 0.21 | 0.19 |
| Tensile Strength | psi | 18.59 | 18.91 | 17.71 | 17.33 | 17.8 |
| Elongation | % | 119.6 | 96.88 | 91.71 | 83.6 | 89.58 |
| ASTM Tear | pli | 1.35 | 1.44 | 1.12 | 1.09 | 1.36 |
| Compression Set 50% | % | 10.68 | 6.66 | 7.99 | 7.99 | 7.10 |
| HACS 50% | % | 21.86 | 19.27 | 21.51 | 20.84 | 19.42 |
| Wet Set 50% | % | 22.42 | 21.43 | 20.35 | 19.78 | 20.63 |

TABLE 14

Physical Properties of Active Polyether using DMC Propoxylates as Starters

|  |  | Ex. 58 | Comp. Ex. 9 | Comp. Ex. 10 |
|---|---|---|---|---|
| Components |  |  |  |  |
| CP2 |  | 85 |  |  |
| CGSP3 |  |  | 85 |  |
| CGSP4 |  |  |  | 85 |
| PMPO1 |  | 15 | 15 | 15 |
| Water |  | 3.49 | 3.49 | 3.49 |
| DEOA-LF |  | 1.5 | 1.5 | 1.5 |
| Surfactant 2 |  | 0.6 | 0.6 | 0.6 |
| Surfactant 3 |  | 0.2 | 0.2 | 0.2 |
| Catalyst 2 |  | 0.25 | 0.25 | 0.25 |
| Catalyst 1 |  | 0.1 | 0.1 | 0.1 |
| Isocyanate A |  | 43.87 | 43.87 | 43.87 |
| Index |  | 100 | 100 | 100 |
| Properties: |  |  |  |  |
| Density | lb/ft³ | 2.12 | 2.15 | 2.2 |
| Resilience | % | 70 | 64 | 69 |
| Air Flow | ft³/min | 4.87 | 4.19 | 0.75 |
| IFD 25% | lb/50 in² | 23.9 | 18.52 | 27.43 |
| IFD 50% |  | 42.37 | 33.84 | 46.42 |
| IFD 65% |  | 65.42 | 53.91 | 71.6 |
| Return Val. @ 25% | % | 84.45 | 83.4 | 81.5 |
| S.F. 65%/25% |  | 2.74 | 2.91 | 2.61 |
| CFD 50% | psi | 0.39 | 0.4 | 0.49 |
| Tensile Strength | psi | 13.15 | 11.42 | 11.04 |
| Elongation | % | 65.23 | 48.18 | 32.87 |
| ASTM Tear | pli | 1.17 | 1.04 | 0.93 |
| Compression Set 50% | % | 7.68 | 10.12 | 9.82 |
| HACS 50% | % | 16.94 | 16.28 | 18.92 |
| Wet Set 50% | % | 11.67 | 12.94 | 15.04 |

The physical property results demonstrate that active polyethers made with DMC alkoxylates that have a molecular weight less 1000 Da give physical properties similar to those of active polyethers made entirely with KOH (i.e. control products). See Tables 11-13. The comparative examples demonstrate that higher molecular weight DMC alkoxylates give products that have several deficiencies in the physical properties compared to products made with all-KOH (i.e. control products). See Table 14.

The foregoing examples of the present invention are offered for the purpose of illustration and not limitation. It will be apparent to those skilled in the art that the embodiments described herein may be modified or revised in various ways without departing from the spirit and scope of the invention. The scope of the invention is to be measured by the appended claims.

What is claimed is:

1. A long chain polyether polyol characterized by a functionality of 2 to 6 and an equivalent weight of 1000 to 2200 Da, and which comprises the alkoxylation product of
   (1) a starter composition having an equivalent weight of 350 Da or less, and which comprises the alkoxylation product of
      (a) a low molecular weight polyether having a functionality of 3 and an equivalent weight of less than 350 Da,
      (b) at least one low molecular weight starter compound comprising glycerin,
      and
      (c) propylene oxide or a mixture of propylene oxide and ethylene oxide, with the weight ratio of propylene oxide to ethylene oxide ranging from 80:20 to 100:0,
      in the presence of
      (d) at least one double metal cyanide catalyst;
   and
   (4) a sorbitol started polyether polyol having a molecular weight of 1,000 to 2,000 and which is base catalyzed;
   with
   (2) one or more alkylene oxides, wherein up to 20% of ethylene oxide is added as a cap,
   in the presence of
   (3) at least one basic catalyst.

2. The long chain polyether polyol of claim 1, wherein (3) said basic catalyst comprises a potassium hydroxide catalyst.

3. The long chain polyether polyol of claim 1, which is characterized by a functionality of 2 to 4 and an equivalent weight of 1500 to 2000 Da.

4. The long chain polyether polyol of claim 1, wherein (1)(a) said low molecular weight polyether has an equivalent weight of 150 to 280 Da, and (1)(c) comprises a mixture of propylene oxide and ethylene oxide in a weight ratio of 90:10 to 100:0.

5. The long chain polyether polyol of claim 1, wherein (2) said one or more alkylene oxides are selected from the group consisting of propylene oxide and a mixture of propylene oxide and ethylene oxide.

6. A process for preparing a long chain polyether polyol characterized by a functionality of 2 to 6 and an equivalent weight of 1000 to 2200 Da, comprising:
   (A) alkoxylating
      (1) a starter composition having an equivalent weight of 350 Da or less, and which comprises the alkoxylation product of
         (a) a low molecular weight polyether having a functionality of 3 and an equivalent weight of less than 350 Da,
         (b) at least one low molecular weight starter compound comprising glycerin,
         and
         (c) propylene oxide or a mixture of propylene oxide and ethylene oxide, with the weight ratio of propylene oxide to ethylene oxide ranging from 80:20 to 100:0,
         in the presence of
         (d) at least one double metal cyanide catalyst;
      and
      (4) a sorbitol started polyether polyol having a molecular weight of 1,000 to 2,000;
      (2) one or more alkylene oxides, wherein up to 20% of ethylene oxide is added as a cap,
      in the presence of
      (3) at least one basic catalyst.

7. The process of claim 6 in which the resultant long chain polyether polyol which is characterized by a functionality of 2 to 4 and an equivalent weight of 1500 to 2000 Da.

8. The process of claim 6, wherein (1)(a) said low molecular weight polyether has an equivalent weight of 150 to 280 Da, and (1)(c) comprises a mixture of propylene oxide and ethylene oxide in a weight ratio of 90:10 to 100:0.

9. The process of claim 6, wherein (2) said one or more alkylene oxides are selected from the group consisting of propylene oxide and a mixture of propylene oxide and ethylene oxide.

10. A polyurethane foam comprising the reaction product of a polyisocyanate component with an isocyanate-reactive component which comprises the long chain polyether polyol of claim 1, in the presence of at least one blowing agent, at least one catalyst and at least one surfactant.

11. A process for preparing a polyurethane foam, comprising reacting a polyisocyanate component with an isocyanate-reactive component which comprises the long chain polyether polyol of claim 1, in the presence of at least one blowing agent, at least one catalyst and at least one surfactant.

12. The process of claim 6, wherein (3) said basic catalyst comprises a potassium hydroxide catalyst.

* * * * *